United States Patent
Narita

(10) Patent No.: US 8,450,880 B2
(45) Date of Patent: May 28, 2013

(54) BROADCASTING RECEIVER AND TELEVISION APPARATUS

(75) Inventor: Shusuke Narita, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 314 days.

(21) Appl. No.: 12/786,986

(22) Filed: May 25, 2010

(65) Prior Publication Data

US 2010/0295380 A1  Nov. 25, 2010

(30) Foreign Application Priority Data

May 25, 2009 (JP) ................. 2009-124941

(51) Int. Cl.
*H02B 1/24* (2006.01)
*H04N 7/173* (2006.01)

(52) U.S. Cl.
USPC .......................................... 307/116; 725/132

(58) Field of Classification Search
None
See application file for complete search history.

(56) References Cited

U.S. PATENT DOCUMENTS

| | | | | |
|---|---|---|---|---|
| 8,169,549 | B2 * | 5/2012 | Kuroyanagi et al. | 348/730 |
| 2005/0229222 | A1 * | 10/2005 | Relan et al. | 725/100 |

FOREIGN PATENT DOCUMENTS

| | | | | |
|---|---|---|---|---|
| JP | 10243318 A | * | 9/1998 | |
| JP | 2004-153885 A | | 5/2004 | |
| JP | 2004-173346 A | | 6/2004 | |
| JP | 2004-280300 A | | 10/2004 | |
| JP | 2006-115577 A | | 4/2006 | |

* cited by examiner

*Primary Examiner* — Rexford Barnie
*Assistant Examiner* — Dru Parries
(74) *Attorney, Agent, or Firm* — Crowell & Moring LLP

(57) ABSTRACT

This broadcasting receiver includes a power supply portion supplying power, a power receptacle portion capable of being connected with a power plug of a peripheral device, a switch portion for making a connection and disconnection between the power supply portion and the power receptacle portion and a control portion. The control portion controls the switch portion to make a disconnection between the power supply portion and the power receptacle portion when having determined that it is not necessary to supply power to the peripheral device.

11 Claims, 9 Drawing Sheets

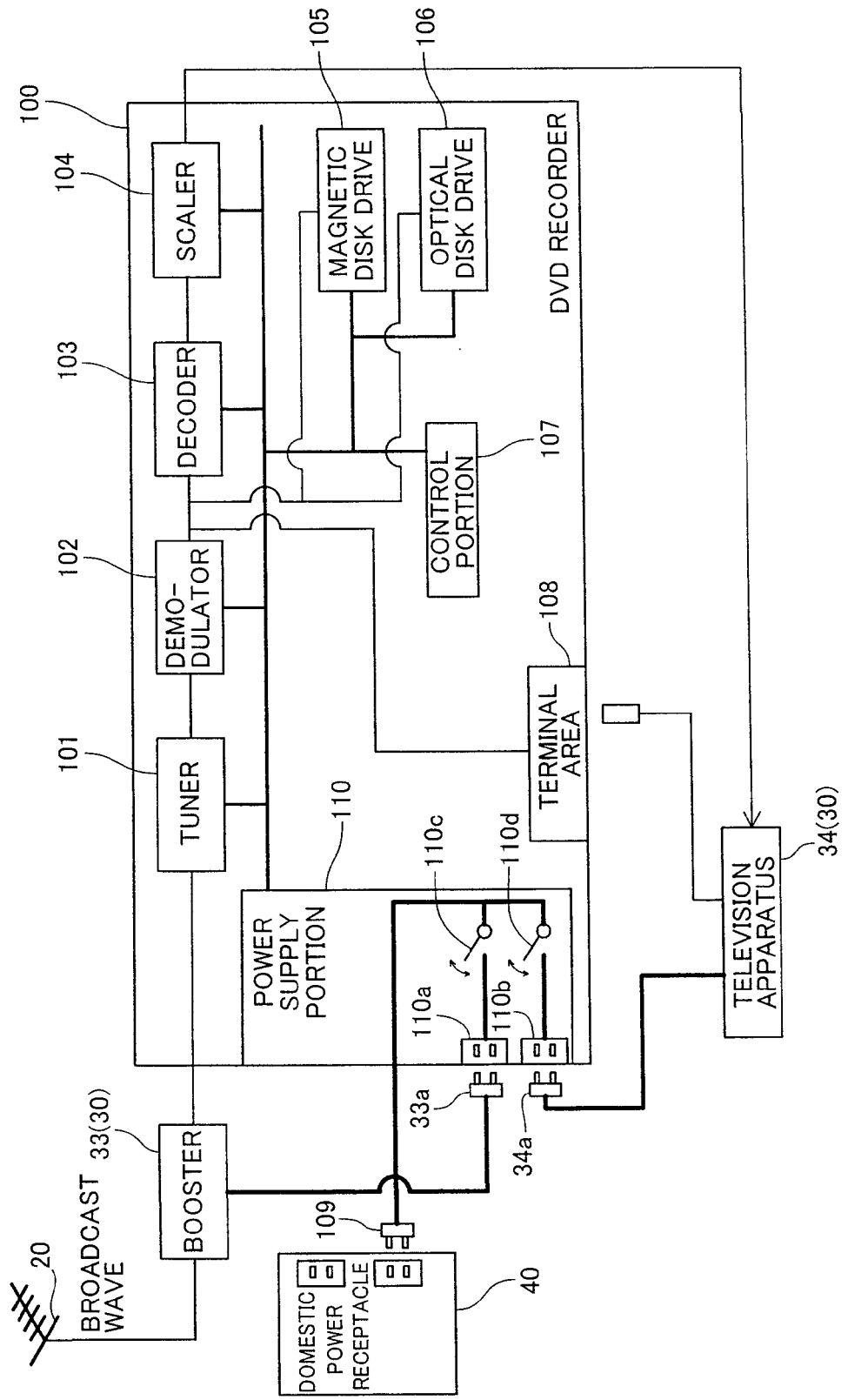

BROADCASTING RECEIVER AND TELEVISION APPARATUS

BACKGROUND OF THE INVENTION

1. Field of the Invention

The present invention relates to a broadcasting receiver and a television apparatus, and more particularly, it relates to a broadcasting receiver and a television apparatus comprising a receiver body generating a video signal on the basis of a broadcast signal.

2. Description of the Background Art

A broadcasting receiver such as a television apparatus generating a video signal on the basis of a broadcast signal, a DVD recorder and an STB (Set Top Box) is known in general. These broadcasting receivers are connected with a variety of peripheral devices (a speaker, a DVD player, a game machine, etc. in the case of the television apparatus, for example). When the peripheral devices are connected to the television apparatus to be used, these peripheral devices are not generally used independently but are used together with the television apparatus such that the a display of the television apparatus displays images reproduced by the DVD player while the speaker outputs sound, for example.

When the television apparatus and the peripheral devices are used as described above, each of power plugs of the television apparatus and the peripheral devices connected to the television apparatus is connected to a power receptacle (domestic power receptacle, power strip or the like), whereby power is often supplied to each of the devices. When a user stops using the peripheral devices, the user hardly unplugs the peripheral devices from the power receptacle each time, and thus the power plugs of the peripheral devices often remain connected to the power receptacle. In this case, the power plugs of the peripheral devices are connected to the power receptacle all the time, and therefore standby power is disadvantageously consumed by the peripheral devices even in the case of not using the peripheral devices.

In order to solve this problem, there is proposed a system capable of reducing standby power of the peripheral devices. For example, each of Japanese Patent Laying-Open Nos. 2006-115577, 2004-173346 and 2004-153885 discloses such a system.

Each of the aforementioned patent documents (Japanese Patent Laying-Open Nos. 2006-115577, 2004-173346 and 2004-153885) discloses a system using an apparatus for cutting standby power (standby power cutting apparatus 3, standby power cutting apparatus 30 and body case in Japanese Patent Laying-Open Nos. 2006-115577, 2004-173346 and 2004-153885, respectively). In each of the aforementioned patent documents, each of power plugs of peripheral devices is connected to a power receptacle through the corresponding apparatus. The apparatuses for cutting standby power of the aforementioned patent documents are capable of determining whether or not the peripheral devices are in a standby state while being capable of cutting power supply to the peripheral devices when the apparatus has determined that the peripheral devices are in a standby state. Therefore, power is not supplied to the peripheral devices disconnected from the power receptacle, whereby standby power of the peripheral devices is cut.

A system capable of automatically switching power on/off of electric equipments on the basis of a prescribed control signal is also known, as disclosed in Japanese Patent Laying-Open No. 2004-280300, for example.

Japanese Patent Laying-Open No. 2004-280300 discloses a power source controller, arranged between a plurality of the electric equipments and a power receptacle, capable of automatically making a connection or disconnection between the electric equipments and the power receptacle. Although this power source controller is not an apparatus for cutting standby power, this power source controller can be conceivably used to cut standby power of peripheral devices when being arranged between the peripheral devices and the power receptacle.

In each of the aforementioned patent documents (Japanese Patent Laying-Open Nos. 2006-115577, 2004-173346 and 2004-153885), however, the apparatus for cutting standby power must be disadvantageously arranged independently between each of the power plugs of the peripheral devices and the power receptacle and connected to each of the power plugs of the peripheral devices and the power receptacle.

Also in Japanese Patent Laying-Open No. 2004-280300, the power source controller must be disadvantageously arranged independently between each of the power plugs of the peripheral devices and the power receptacle and connected to each of the power plugs of the peripheral devices and the power receptacle.

SUMMARY OF THE INVENTION

The present invention has been proposed in order to solve the aforementioned problems, and an object of the present invention is to provide a broadcasting receiver and a television apparatus capable of inhibiting increase of power consumption due to standby power without separately providing an apparatus for cutting standby power.

A broadcasting receiver according to a first aspect of the present invention comprises a receiver body generating a video signal on the basis of a broadcast signal received by a broadcast signal receiving portion, a power supply portion supplying power to the receiver body, a power receptacle portion connected to the power supply portion and capable of being connected with a power plug of a peripheral device for supplying power to the peripheral device from the power supply portion, a switch portion for making a connection and disconnection between the power supply portion and the power receptacle portion, and a control portion controlling the receiver body, wherein the control portion determines whether or not it is necessary to supply power to the peripheral device connected to the power receptacle portion on the basis of a prescribed set information, and controls the switch portion to make a disconnection between the power supply portion and the power receptacle portion when having determined that it is not necessary to supply power to the peripheral device.

In the broadcasting receiver according to the first aspect, as hereinabove described, the power receptacle portion capable of being connected with the power plug of the peripheral device for supplying power to the peripheral device from the power supply portion is provided, whereby power can be supplied to the peripheral device from the broadcasting receiver. Generally, a power plug of the broadcasting receiver generating the video signal on the basis of the broadcast signal remains connected to a domestic power receptacle or the like to be used, so that it is often the case that power is supplied all the time. Thus, power is supplied to the power supply portion of the broadcasting receiver from the domestic power receptacle or the like all the time. Therefore, the power receptacle portion provided on the broadcasting receiver can be used as a power source for the peripheral device instead of the domestic power receptacle or the like.

When the broadcasting receiver is used as a power source for the peripheral device as described above, the switch portion is so controlled as to make a disconnection between the power supply portion and the power receptacle portion where it has been determined that it is not necessary to supply power to the peripheral device on the basis of the prescribed set information, whereby power supply to the peripheral device can be automatically stopped even if the power plug of the peripheral device remains connected to the power receptacle portion when the peripheral device is not being used (when power supply to the peripheral devise is not needed). Consequently, standby power consumption of the peripheral device can be inhibited although the peripheral device is not being used, whereby increase of power consumption due to standby power can be inhibited.

Further, the power receptacle portion and the switch portion are provided on the broadcasting receiver and the control portion controls the switch portion, whereby standby power of the peripheral device connected to the broadcasting receiver can be reduced by the control by the control portion of the broadcasting receiver. Consequently, no apparatus for cutting standby power other than the broadcasting receiver may be separately provided.

In the aforementioned broadcasting receiver according to the first aspect, the set information preferably includes information about whether to make a connection or disconnection between the power supply portion and the power receptacle portion, set with respect to each of a preliminarily set plurality of modes of use of the broadcasting receiver. According to this structure, a connection or disconnection between the power supply portion and the power receptacle portion can be made in response to the respective plurality of modes of use of the broadcasting receiver. Thus, power supply to the peripheral device can be automatically stopped even if the power plug of the peripheral device remains connected to the power receptacle portion when the mode of use of the broadcasting receiver has turned to a mode of use in which the peripheral device is not used by setting the set information to make a disconnection between the power supply portion and the power receptacle portion when the mode of use of the broadcasting receiver has turned to a mode of use in which the peripheral device is not used. Further, power supply to the peripheral device can be automatically started when the mode of use of the broadcasting receiver has turned to a mode of use in which the peripheral device is used by setting the set information to make a connection between the power supply portion and the power receptacle portion when the mode of use of the broadcasting receiver has turned to a mode of use in which the peripheral device is used. In addition, a connection state/a disconnection state between the power supply portion and the power receptacle portion can be switched on the basis of the mode of use of the broadcasting receiver, so that no detection mean determining whether or not the peripheral device is in a standby state may be provided separately.

In the aforementioned structure in which the set information is set with respect to each of the preliminarily set plurality of modes of use of the broadcasting receiver, at least part of the set information is preferably so formed as to be capable of being set by a user, in response to the preliminarily set plurality of modes of use of the broadcasting receiver. According to this structure, the user can reset the set information in accordance with changed peripheral device (mode of use of the broadcasting receiver) also when the peripheral device connected to the power receptacle portion is changed.

In this case, the set information is preferably so formed as to be capable of being set by a user such that it is determined that it is not necessary to supply power to the peripheral device in a prescribed first mode of use when not using the peripheral device supplied with power from the power receptacle portion in the first mode of use and such that it is determined that it is necessary to supply power to the peripheral device in a prescribed second mode of use when using the peripheral device supplied with power from the power receptacle portion in the second mode of use. According to this structure, power supply to the peripheral device can be automatically stopped in the first mode of use in which the peripheral device obtaining a power source from the power receptacle portion is not used, while power can be automatically supplied to the peripheral device in a case of having changed to the second mode of use in which the peripheral device obtaining a power source from the power receptacle portion is used.

In the aforementioned structure in which the set information is set with respect to each of the preliminarily set plurality of modes of use of the broadcasting receiver, the peripheral device preferably includes an external device outputting a video signal, the receiver body is preferably so formed as to be capable of transmitting at least any of a video signal based on the broadcast signal, a video signal based on video data possessed by the broadcasting receiver itself and a video signal from the external device to a display portion in response to a selection by a user, and the set information preferably includes information about whether to make a connection or disconnection between the power supply portion and the power receptacle portion, set correspondingly to a type of a video signal transmitted to the display portion by the receiver body, as information set with respect to each of the plurality of modes of use. According to this structure, power supply to the peripheral device not used in a prescribed mode of use of the plurality of modes of use (the video signal based on the broadcast signal, the video signal based on video data possessed by the broadcasting receiver itself and the video signal from the external device, for example) can be automatically stopped even if the power plug of the peripheral device remains connected to the power receptacle portion when the broadcasting receiver is in the prescribed mode of use in which the peripheral device is not used by setting the set information to make a disconnection between the power supply portion and the power receptacle portion in the case of the prescribed mode of use. Further, power supply to the peripheral device can be automatically started when the broadcasting receiver is in the mode of use in which the peripheral device is used by setting the set information to make a connection between the power supply portion and the power receptacle portion in the case of a mode of use other than the prescribed mode of use.

In the aforementioned structure in which the receiver body can transmit the video signal to the display portion in response to a selection by a user, the broadcasting receiver is preferably a television apparatus, and the external device as the peripheral device is preferably a recording device. According to this structure, when obtaining a power source of the recording device often used together with the television apparatus from the power receptacle portion of the television apparatus, standby power of the recording device can be reduced.

In the aforementioned structure in which the receiver body can transmit the video signal to the display portion in response to a selection by a user, set information at least corresponding to a type of a video signal transmitted to the display portion by the receiver body, of the set information is preferably so formed as to be capable of being set by a user. According to this structure, when the user switches the type of the video signal transmitted to the display portion by the receiver body, the user can set the set information to make a connection or disconnection of the switch portion correspondingly to a switched video signal.

In the aforementioned structure in which the receiver body can transmit the video signal to the display portion in response to a selection by a user, the set information is preferably formed such that a user can confirm and set the set information on a setting screen displayed on the display portion. According to this structure, the user can easily set the set information while looking at the setting screen on the display portion to confirm the set information.

In the aforementioned structure in which the set information is set with respect to each of the preliminarily set plurality of modes of use of the broadcasting receiver, the set information preferably includes information about whether to make a connection or disconnection between the power supply portion and the power receptacle portion when turning off a power switch of the broadcasting receiver while maintaining power supply to the control portion, as information set with respect to each of the plurality of modes of use. According to this structure, power supply to the peripheral device can be automatically stopped when turning off the broadcasting receiver by setting the set information to make a disconnection between the power supply portion and the power receptacle portion when turning off the broadcasting receiver, so that standby power of the peripheral device can be reduced even if the power plug of the peripheral device remains connected to the power receptacle portion. Further, when connecting the power plug of the peripheral device possibly used independently to the power receptacle portion of the broadcasting receiver also in a state where the power source of the broadcasting receiver is off, the peripheral device can be used independently also when turning off the broadcasting receiver by setting the set information to maintain a connection between the power supply portion and the power receptacle portion even if the power source of the broadcasting receiver is turned off.

In this case, the set information is preferably preliminarily set to make a disconnection between the power supply portion and the power receptacle portion when turning off the power switch of the broadcasting receiver while maintaining power supply to the control portion. According to this structure, when obtaining the power source of the peripheral device used together with the broadcasting receiver from the power receptacle portion of the broadcasting receiver, power supply to the peripheral device can be stopped while turning off the broadcasting receiver, whereby standby power of the peripheral device can be reduced.

In the aforementioned broadcasting receiver according to the first aspect, a plurality of the power receptacle portions are preferably provided. According to this structure, power sources of a plurality of the peripheral devices can be obtained from the broadcasting receiver so that convenience can be improved.

In this case, a plurality of the switch portions are preferably so provided as to correspond to the respective plurality of power receptacle portions, and the set information is preferably so formed as to be capable of being individually set by a user with respect to each of the plurality of power receptacle portions. According to this structure, a connection state and a disconnection state between the power supply portion and the power receptacle portion can be switched in response to each of the peripheral devices on the basis of the set information individually set with respect to each of the plurality of power receptacle portions, also when connecting different types of peripheral devices to the respective plurality of power receptacle portions.

In the aforementioned broadcasting receiver according to the first aspect, at least part of the set information is preferably so formed as to be capable of being set by a user. According to this structure, the user can set the set information himself/herself to properly supply power or stop power supply in response to a type or the like of the peripheral device connected to the power receptacle portion.

The aforementioned broadcasting receiver according to the first aspect preferably further comprises a housing in which the receiver body, the power supply portion and the control portion are placed, and the power receptacle portions are integrally provided on the housing. According to this structure, a user can easily obtain the power source of the peripheral device used together with the broadcasting receiver from the power receptacle portion provided on the housing of the broadcasting receiver.

A television apparatus according to a second aspect of the present invention comprises a receiver body generating a video signal on the basis of a broadcast signal received by a broadcast signal receiving portion, a power supply portion supplying power to the receiver body, a power receptacle portion connected to the power supply portion and capable of being connected with a power plug of a peripheral device for supplying power to the peripheral device from the power supply portion, a switch portion for making a connection and disconnection between the power supply portion and the power receptacle portion, a display portion capable of displaying images based on a video signal by at least the broadcast signal, and a control portion controlling the receiver body, wherein the control portion determines whether or not it is necessary to supply power to the peripheral device connected to the power receptacle portion on the basis of a prescribed set information, and controls the switch portion to make a disconnection between the power supply portion and the power receptacle portion when having determined that it is not necessary to supply power to the peripheral device.

In the television apparatus according to the second aspect, as hereinabove described, the power receptacle portion capable of being connected with the power plug of the peripheral device for supplying power to the peripheral device from the power supply portion is provided, whereby power can be supplied to the peripheral device from the television apparatus. Generally, a power plug of the television apparatus generating the video signal on the basis of the broadcast signal remains connected to a domestic power receptacle or the like to be used, so that it is often the case that power is supplied all the time. Thus, power is supplied to the power supply portion of the television apparatus from the domestic power receptacle or the like all the time. Therefore, the power receptacle portion provided on the television apparatus can be used as a power source for the peripheral device instead of the domestic power receptacle or the like.

When the television apparatus is used as a power source for the peripheral device as described above, the switch portion is so controlled as to make a disconnection between the power supply portion and the power receptacle portion where it has been determined that it is not necessary to supply power to the peripheral device on the basis of the prescribed set information, whereby power supply to the peripheral device can be automatically stopped even if the power plug of the peripheral device remains connected to the power receptacle portion when the peripheral device is not being used (when power supply to the peripheral devise is not needed). Consequently, standby power consumption of the peripheral device can be inhibited although the peripheral device is not being used, whereby increase of power consumption due to standby power can be inhibited.

Further, the power receptacle portion and the switch portion are provided on the television apparatus and the control portion controls the switch portion, whereby standby power of the peripheral device connected to the television apparatus can be reduced by the control by the control portion of the television apparatus. Consequently, no apparatus for cutting standby power other than the television apparatus may be separately provided.

In the aforementioned television apparatus according to the second aspect, the set information preferably includes information about whether to make a connection or disconnection between the power supply portion and the power receptacle portion, set with respect to each of a preliminarily set plurality of modes of use of the television apparatus. According to this structure, a connection or disconnection between the power supply portion and the power receptacle portion can be made in response to the respective plurality of modes of use of the television apparatus. Thus, power supply to the peripheral device can be automatically stopped even if the power plug of the peripheral device remains connected to the power receptacle portion when the mode of use of the television apparatus has turned to a mode of use in which the peripheral device is not used by setting the set information to make a disconnection between the power supply portion and the power receptacle portion when the mode of use of the television apparatus has turned to a mode of use in which the peripheral device is not used. Further, power supply to the peripheral device can be automatically started when the mode of use of the television apparatus has turned to a mode of use in which the peripheral device is used by setting the set information to make a connection between the power supply portion and the power receptacle portion when the mode of use of the television apparatus has turned to a mode of use in which the peripheral device is used. In addition, a connection state/a disconnection state between the power supply portion and the power receptacle portion can be switched on the basis of the mode of use of the television apparatus, so that no detection mean determining whether or not the peripheral device is in a standby state may be provided separately.

In the aforementioned television apparatus according to the second aspect, at least part of the set information is preferably so formed as to be capable of being set by a user, in response to the preliminarily set plurality of modes of use of the television apparatus. According to this structure, the user can reset the set information in accordance with changed peripheral device (mode of use of the broadcasting receiver) also when the peripheral device connected to the power receptacle portion is changed.

In the aforementioned structure in which the set information is set with respect to each of the preliminarily set plurality of modes of use of the television apparatus, the peripheral device preferably includes an external device outputting a video signal, the receiver body is preferably so formed as to be capable of transmitting at least any of a video signal based on the broadcast signal, a video signal based on video data possessed by the television apparatus itself and a video signal from the external device to a display portion in response to a selection by a user, and the set information preferably includes information about whether to make a connection or disconnection between the power supply portion and the power receptacle portion, set correspondingly to a type of a video signal transmitted to the display portion by the receiver body, as information set with respect to each of the plurality of modes of use. According to this structure, power supply to the peripheral device not used for a prescribed input mode of a plurality of input modes (ground wave broadcast, BS broadcast, VIDEO1, HDMI1, reproduction of video data stored in a memory and so on, for example) can be automatically stopped even if the power plug of the peripheral device remains connected to the power receptacle portion when the television apparatus is in a mode of use in which the peripheral device is not used (when an input mode in which the peripheral device is not used is selected) by setting the set information to make a disconnection between the power supply portion and the power receptacle portion when the prescribed input mode is selected. Further, power supply to the peripheral device can be automatically started when the television apparatus is in a mode of use in which the peripheral device is used (when an input mode in which the peripheral device is used is selected) by setting the set information to make a connection between the power supply portion and the power receptacle portion when an input mode other than the prescribed input mode is selected.

In the aforementioned structure in which the set information is set with respect to each of the preliminarily set plurality of modes of use of the television apparatus, the set information preferably includes information about whether to make a connection or disconnection between the power supply portion and the power receptacle portion when turning off a power switch of the television apparatus while maintaining power supply to the control portion, as information set with respect to each of the plurality of modes of use. According to this structure, power supply to the peripheral device can be automatically stopped when turning off the television apparatus by setting the set information to make a disconnection between the power supply portion and the power receptacle portion when turning off the television apparatus, so that standby power of the peripheral device can be reduced even if the power plug of the peripheral device remains connected to the power receptacle portion. Further, when connecting the power plug of the peripheral device possibly used independently to the power receptacle portion of the television apparatus also in a state where the power source of the television apparatus is off, the peripheral device can be used independently also when turning off the television apparatus by setting the set information to maintain a connection between the power supply portion and the power receptacle portion even if the power source of the television apparatus is turned off.

In the aforementioned television apparatus according to the second aspect, a plurality of power receptacle portions are preferably provided, a plurality of switch portions are preferably so provided as to correspond to the respective plurality of power receptacle portions, and the set information is preferably so formed as to be capable of being individually set by a user with respect to each of the plurality of power receptacle portions. According to this structure, power sources of a plurality of peripheral devices can be obtained from the television apparatus so that convenience can be improved. Further, a connection state and a disconnection state between the power supply portion and the power receptacle portion can be switched in response to each of the peripheral devices on the basis of the set information individually set with respect to each of the plurality of power receptacle portions, also when connecting different types of peripheral devices to the respective plurality of power receptacle portions.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 10 is a block diagram showing the structure of a DVD recorder according to a second embodiment of the present invention.

DESCRIPTION OF THE PREFERRED EMBODIMENTS

Embodiments of the present invention are now described with reference to the drawings.

First Embodiment

First, the structure of a television apparatus 1 according to a first embodiment of the present invention is described with reference to FIGS. 1 to 7. The first embodiment of the present invention is applied to the television apparatus 1 employed as an exemplary "broadcasting receiver" in the present invention.

In the television apparatus 1, a display portion 2 displays images based on a video signal generated on the basis of a television broadcast or images based on a video signal from an external device, as shown in FIGS. 1 to 4. The display portion 2 is formed by an LCD (Liquid Crystal Display).

Figure 4:
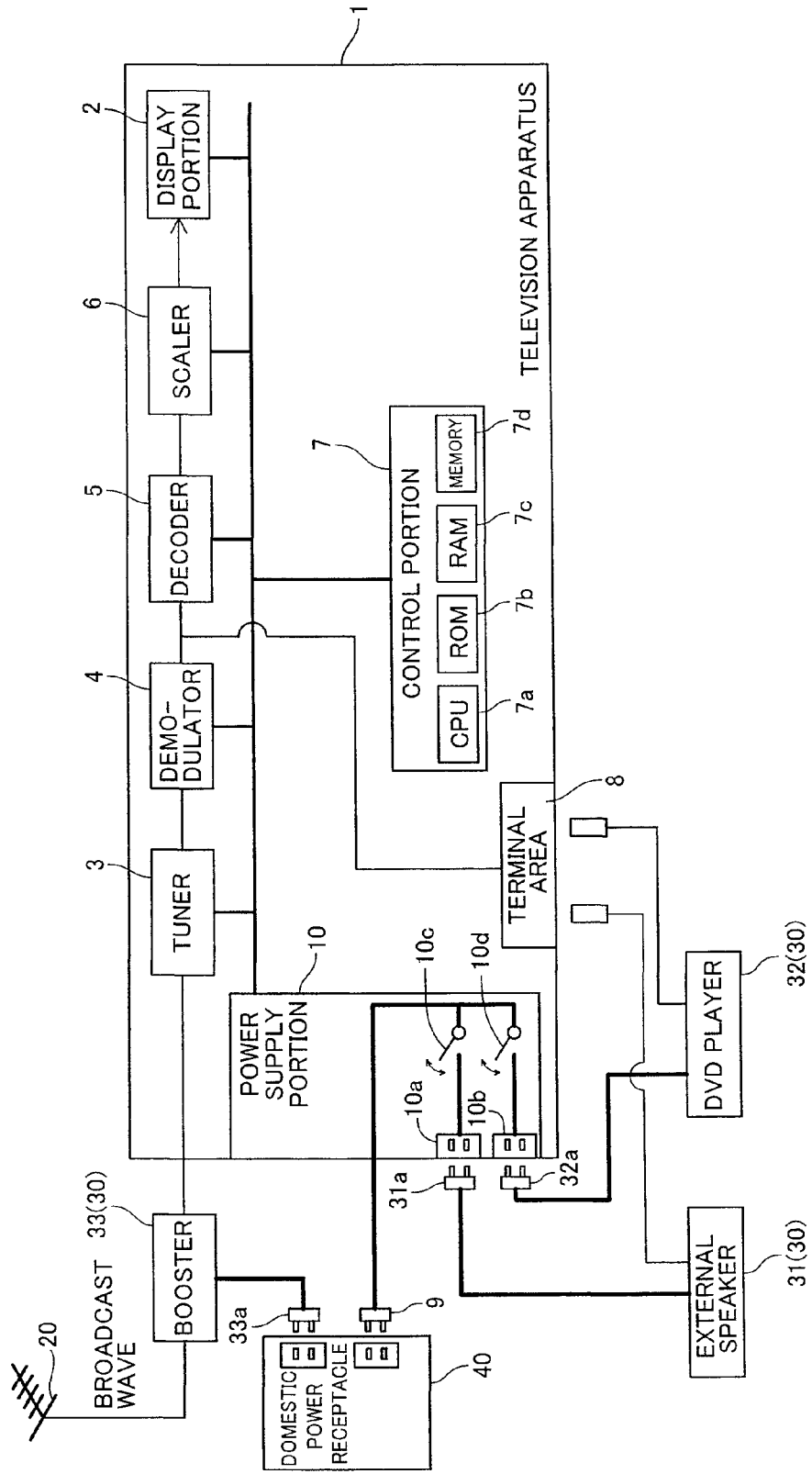
FIG. 4 is a block diagram showing the structure of the television apparatus (a state of being connected with an external speaker and a DVD player) according to the first embodiment of the present invention.

As shown in FIG. 4, the television apparatus 1 comprises a tuner 3 receiving a television broadcast corresponding to an analog or digital broadcast such as a ground wave broadcast and a BS broadcast through a television antenna 20, a demodulator 4 demodulating a broadcast signal output from the tuner 3 into digital data, a decoder 5 converting a signal from the demodulator 4 into a video signal, a scaler 6 having a function of outputting the video signal from the decoder 5 in accordance with the display portion 2, the display portion 2 displaying images on the basis of the video signal output from the scaler 6, and a control portion 7 controlling each part of the television apparatus 1. The control portion 7 is constituted by a CPU 7a, a ROM 7b, a RAM 7c, a memory 7d, etc. and controls an operation of each part of the television apparatus 1 on the basis of a program stored in the ROM 7b or the like. The memory 7d is a nonvolatile memory such as an EEPROM where data is rewritable, and various set information is stored in the memory 7d. The control portion 7 controls the operation of each part of the television apparatus 1 also on the basis of the set information of the memory 7d. The tuner 3 is an example of the "broadcast signal receiving portion" in the present invention. The "receiver body" in the present invention is constituted by the tuner 3, the demodulator 4, the decoder 5, the scaler 6, etc. The tuner 3, the demodulator 4, the decoder 5, the scaler and so on, the control portion 7, and a power supply portion 10 described later are placed in a housing 1a.

Figure 1:
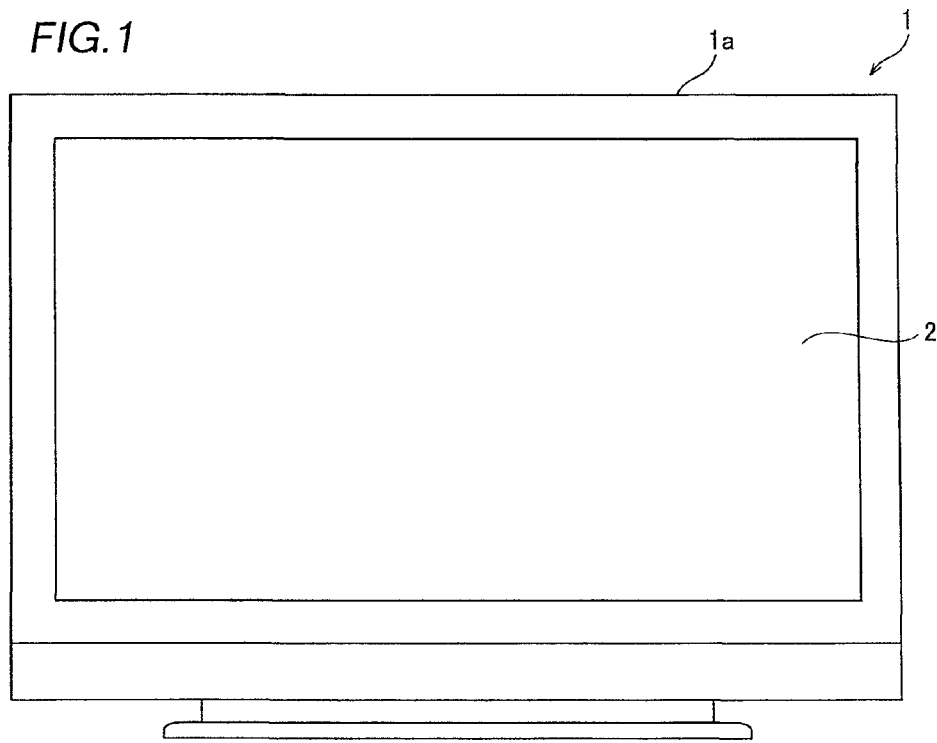
FIG. 1 is a front elevational view showing a television apparatus according to a first embodiment of the present invention.
Figure 2:
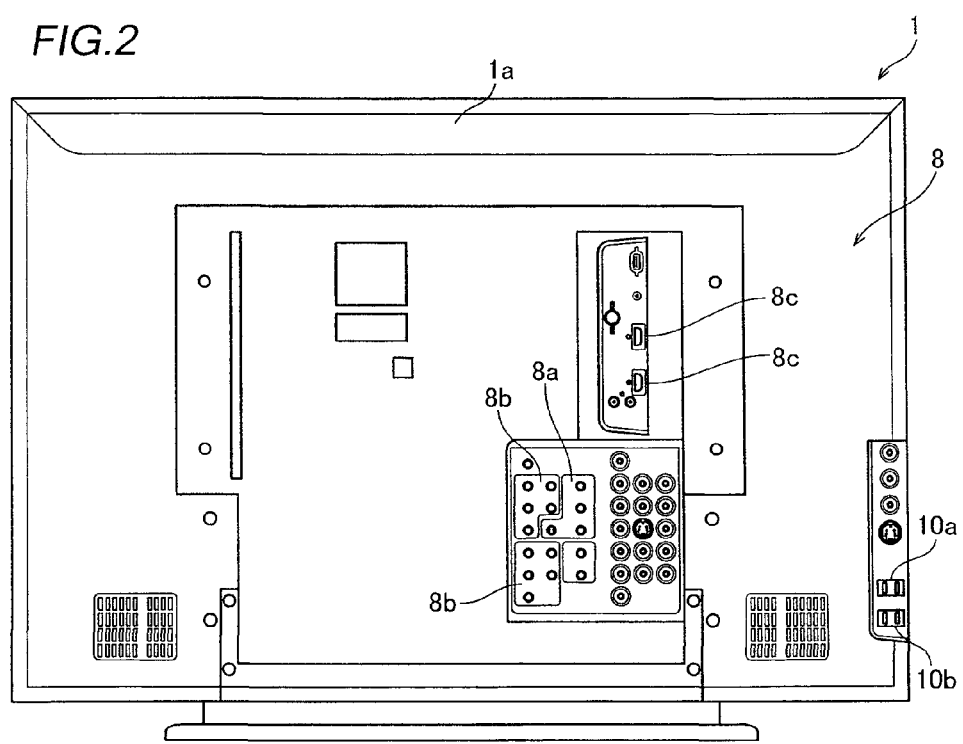
FIG. 2 is a back elevational view showing the television apparatus according to the first embodiment of the present invention.

As shown in FIG. 2, a terminal area 8 constituted by a plurality of terminals (video terminals 8a, component terminals 8b, HDMI terminals 8c, etc.) for connecting peripheral devices 30 (see FIG. 4) is provided on the back surface of the television apparatus 1 so that a variety of the peripheral devices 30 can be connected to the television apparatus 1 through the terminal area 8. For example, an external speaker 31 is connected to the television apparatus 1 as shown in FIG. 4, whereby sound output from the television apparatus 1 can be reproduced by the external speaker 31. Further, a DVD player 32 outputting a video signal stored on a DVD is connected to the television apparatus 1, whereby images based on the video signal from the DVD player 32 can be reproduced on the display portion 2 of the television apparatus 1. A broadcast signal is amplified by a booster 33 when a radio wave received by the antenna 20 is weak. The external speaker 31 and the booster 33 are examples of the "peripheral devices" in the present invention, and the DVD player 32 is an example of each of the "peripheral device", "recording device" and "external device" in the present invention.

In the television apparatus 1, a user can select which images from among images based on a video signal by the ground wave broadcast, a video signal by the BS broadcast and a video signal from any one of the external devices to be displayed on the display portion 2. Specifically, according to the first embodiment, the user performs a prescribed operation thereby being capable of selecting an input mode of any one of ground wave broadcast, BS broadcast, VIDEO1, COMPONENT1, COMPONENT2, HDMI1 and HDMI2. When the ground wave broadcast and the BS broadcast are selected, respective images corresponding to the ground wave broadcast and images corresponding to the BS broadcast are displayed on the display portion 2. When the VIDEO1 is selected, the external device (DVD player 32 etc.) is connected to the terminal corresponding to the VIDEO1 in the terminal area 8, and at that time, images based on the video signal from the external device are displayed on the display portion 2 where the video signal from the external device is input to the television apparatus 1. The images based on the video signal from the external device are displayed on the display portion 2 where the external device is connected to the terminal corresponding to a selected input mode, also when any of the other input modes is selected.

The television apparatus 1 is so formed as to supply power to each of the display portion 2, the tuner 3, the demodulator 4, the decoder 5, the scaler 6, the control portion 7 and so on. through the power supply portion 10 by connecting a power plug 9 thereof to a domestic power receptacle 40. A power source (sub power source) of the television apparatus 1 can be switched on/off by operating a power switch (not shown) thereof, a remote control (not shown) or the like. When the power source is on, power is supplied to each of the display portion 2, the tuner 3, the demodulator 4, the decoder 5, the scaler 6, the control portion 7 and so on. When the power source is off, power is not supplied to the display portion 2, the tuner 3, the demodulator 4, the decoder 5, the scaler 6 and so on but is supplied to the control portion 7. Power is supplied to the control portion 7 (power supply to the control portion 7 is maintained) also when the power source is off, whereby a part (clock function, for example) of functions of the control portion 7 continues.

Figure 3:
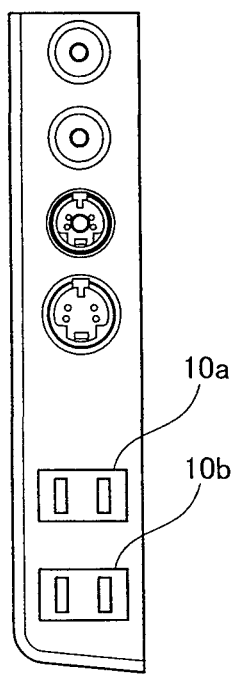
FIG. 3 is an enlarged back elevational view showing a terminal area of the television apparatus according to the first embodiment of the present invention.

According to the first embodiment, two power receptacles (first power receptacle 10a and second power receptacle 10b) are integrally provided on the housing 1a of the television apparatus 1, as shown in FIGS. 2 and 3. The first power receptacle 10a and the second power receptacle 10b are arranged in the terminal area 8. The power plugs of the peripheral devices are connected to these first power receptacle 10a and second power receptacle 10b so that power can be supplied to the peripheral devices from the television apparatus 1. In an example shown in FIG. 4, a power plug 31a of the external speaker 31 and a power plug 32a of the DVD player 32 are connected to the first power receptacle 10a and the second power receptacle 10b, respectively. A power plug 33a of the booster 33 is connected to the domestic power receptacle 40. The first power receptacle 10a and the second power receptacle 10b are examples of the "power receptacle portion" in the present invention.

Each of the first power receptacle 10a and the second power receptacle 10b is connected to the power supply portion 10. Two switches (first switch 10c and second switch 10d) switching a connection state and a disconnection state between the power supply portion 10 and each of the first power receptacle 10a and the second power receptacle 10b are provided on the power supply portion 10. When the first switch 10c is on, the first power receptacle 10a and the power supply portion 10 are connected to each other, whereby power is supplied to the peripheral device 30 (external speaker 31) connected to the first power receptacle 10a through the power supply portion 10. When the first switch 10c is off, the first power receptacle 10a and the power supply portion 10 are disconnected from each other, whereby power is not supplied to the peripheral device 30 (external speaker 31) even if the power plug 31a of the peripheral device 30 is connected to the first power receptacle 10a. This also applies to the second switch 10d. The first switch 10c and the second switch 10d are examples of the "switch portion" in the present invention.

The first switch 10c and the second switch 10d are so formed as to be switched on/off by the control portion 7. Specifically, the control portion 7 is so formed as to switch on/off the first switch 10c and the second switch 10d on the basis of economy power receptacle set information (see FIG. 5) stored in the memory 7d. This economy power receptacle set information includes information about whether to turn on or off each of the first switch 10c and the second switch 10d in one mode of use of the television apparatus 1, which is individually set with respect to each of prescribed set modes of use and with respect to each of the first switch 10c and the second switch 10d. Examples of the mode of use include a state where a user selects one input mode corresponding to a state where a ground wave broadcast is received by the television apparatus 1, a BS broadcast is received by the television apparatus 1, content from the external device such as the DVD player 32 is received by the television apparatus 1 or the like, so that images based on a video signal corresponding to the selected input mode are displayed on the display portion 2, for example. The examples of the mode of use also include a state where the power source of the television apparatus 1 is on or off. In other words, the control portion 7 is so formed as to automatically switch on/off the first switch 10c and the second switch 10d, depending on whether the power source of the television apparatus 1 is on or off and which images from among images based on a ground wave broadcast, a BS broadcast, an input signal from the external device and so on are received (which input mode is selected) where the power source of the television apparatus 1 is on.

A user can change the economy power receptacle set information. The user can confirm and change the economy power receptacle set information on an economy power receptacle setting screen 2a displayed by an operation of the user. The economy power receptacle setting screen 2a is now described in detail.

Figure 5:
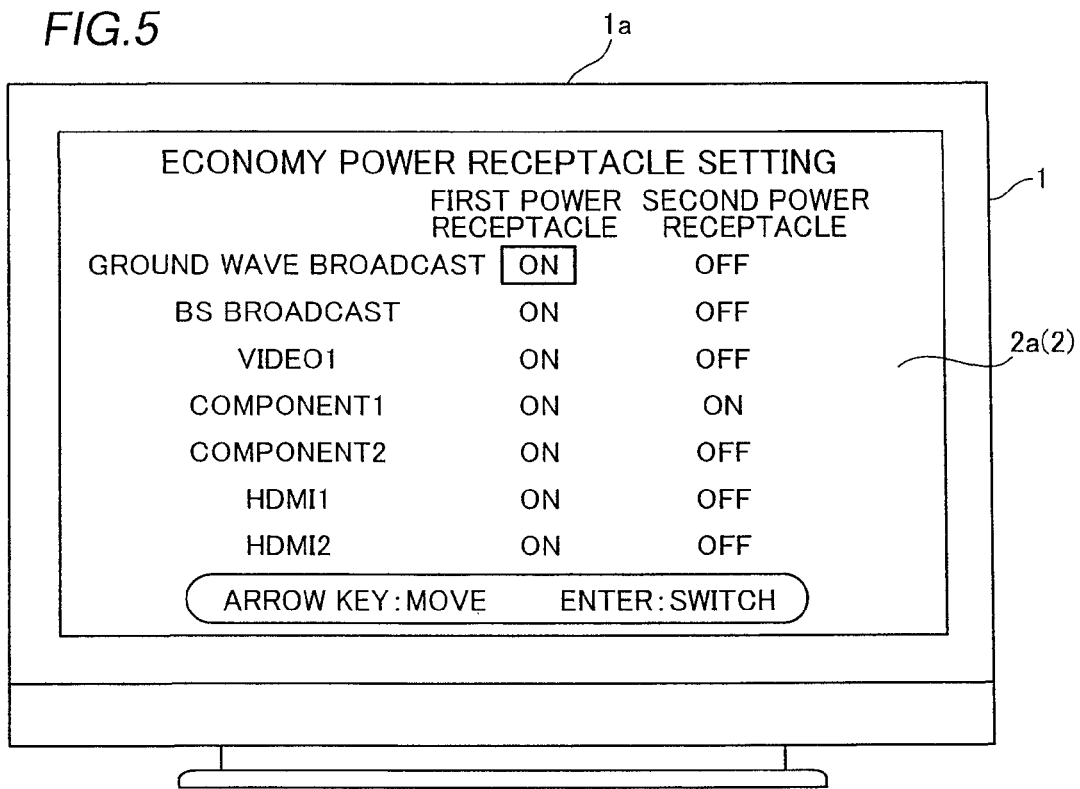
FIG. 5 is a diagram showing an economy power receptacle setting screen in a case of being connected with peripheral devices as shown in FIG. 4, of the television apparatus according to the first embodiment of the present invention.

As shown in FIG. 5, the economy power receptacle set information about whether the first switch 10c and the second switch 10d making a connection between each of the first power receptacle 10a and the second power receptacle 10b and the power supply portion 10 are turned on or off can be changed in response to each content (mode of use) received by the television apparatus 1 on the economy power receptacle setting screen 2a. According to the first embodiment, the first switch 10c and the second switch 10d are fixedly set so as to be both turned off when the power source of the television apparatus 1 is off. The user cannot change this setting.

FIG. 5 shows an example of the economy power receptacle setting screen 2a, in which set information in a case where the power plug 31a of the external speaker 31 and the power plug 32a of the DVD player 32 are connected to the first power receptacle 10a and the second power receptacle 10b, respectively as shown in FIG. 4 is set. Set information of the first power receptacle 10a connected with the external speaker 31 is all set to be on. In other words, the external speaker 31 must output sound in all cases where a ground broadcast is received, a BS broadcast is received, images from the external device are received and so on, whereby the set information is so set as to supply power to the external speaker 31 regardless of mode of use. Set information of the second power receptacle 10b connected with the DVD player 32 is set to be on only in "COMPONENT1". In other words, content from the DVD player 32 can be received only when a user selects "COMPONENT1", whereby it is not necessary to supply power to the DVD player 32 when the other input modes (such as "GROUND WAVE BROADCAST", "VIDEO1" and "HDMI1") are selected. Therefore, the set information is so set that the second switch 10d is turned on while power is supplied to the DVD player 32 from the second power receptacle 10b only when the user selects "COMPONENT1" to receive content from the DVD player 32, and power is not supplied to the DVD player 32 when the other input modes are selected.

Figure 6:
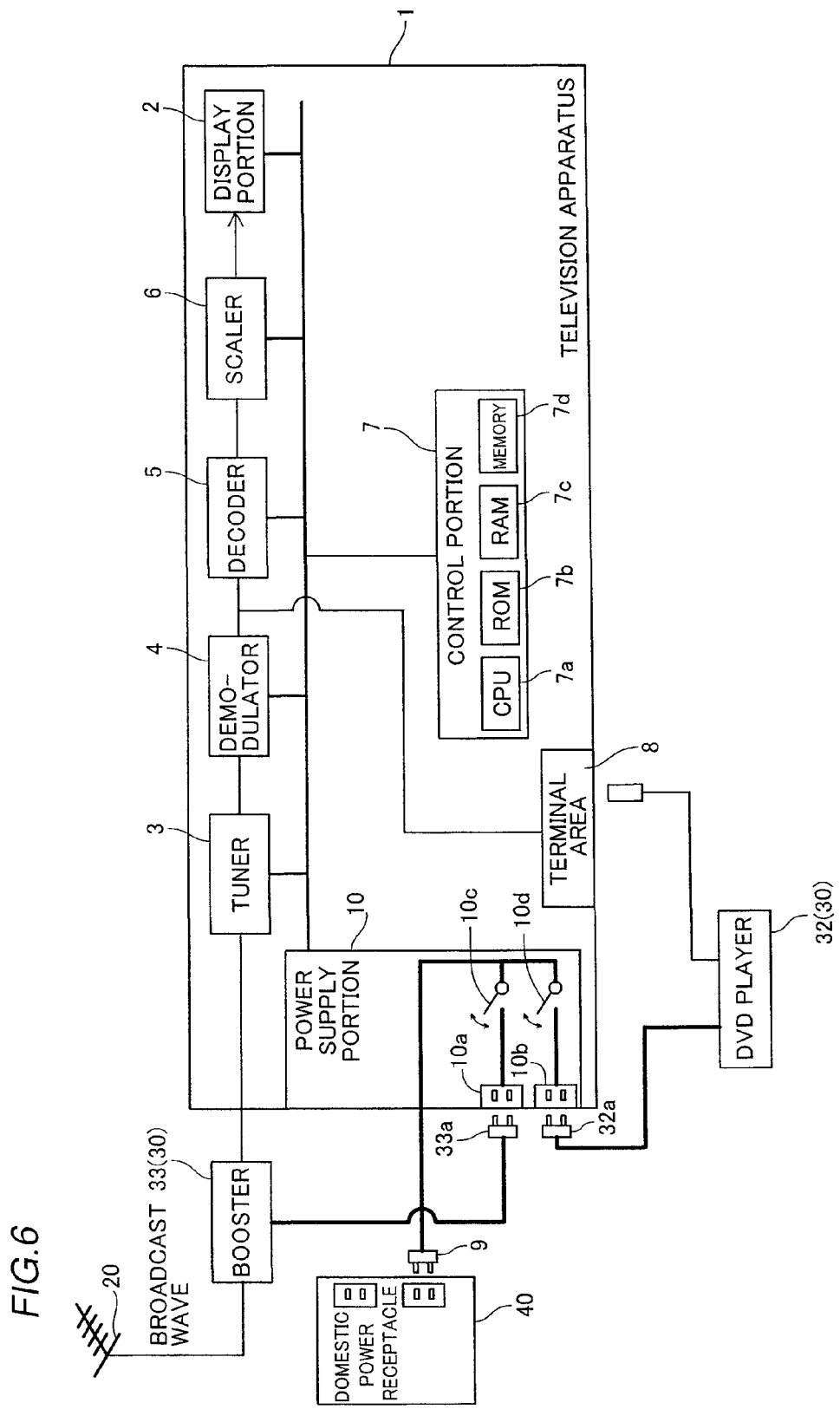
FIG. 6 is a block diagram showing the structure of the television apparatus (a state of being connected with a booster and the DVD player) according to the first embodiment of the present invention.
Figure 7:
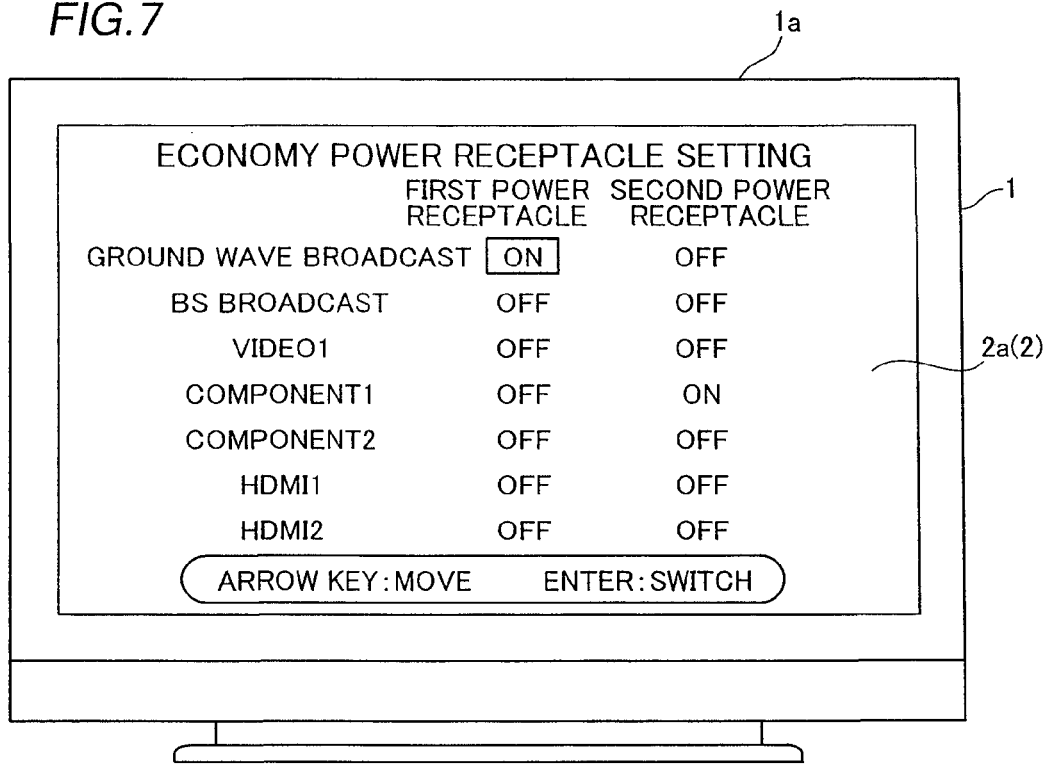
FIG. 7 is a diagram showing the economy power receptacle setting screen in a case of being connected with the peripheral devices as shown in FIG. 6, of the television apparatus according to the first embodiment of the present invention.

A user can change the economy power receptacle set information such that when the power plug 33a of the booster 33 instead of the power plug 31a of the external speaker 31 (see FIG. 4) is connected to the first power receptacle 10a as shown in FIG. 6, power is supplied to the booster 33 from the first power receptacle 10a only where a ground wave broadcast is received, and power is not supplied to the booster 33 from the first power receptacle 10a where the other input modes (such as "VIDEO1", "COMPONENT1" and "HDMI1") are selected, as shown in FIG. 7. Since the booster 33 is an apparatus for amplifying a signal of a ground wave broadcast when the signal is weak, this function is not needed except for a case where a ground wave broadcast is received.

Control of power supply (switching process of switches) to the peripheral devices of the television apparatus 1 according to the first embodiment of the present invention is now described with reference to FIGS. 8 and 9.

A user selects an arbitrary input mode (such as ground wave broadcast, BS broadcast, VIDEO1 and COMPO- NENT1) by operating the remote control (not shown) or the like. The control portion 7 displays images of the selected input mode on the display portion 2.

Figure 8:
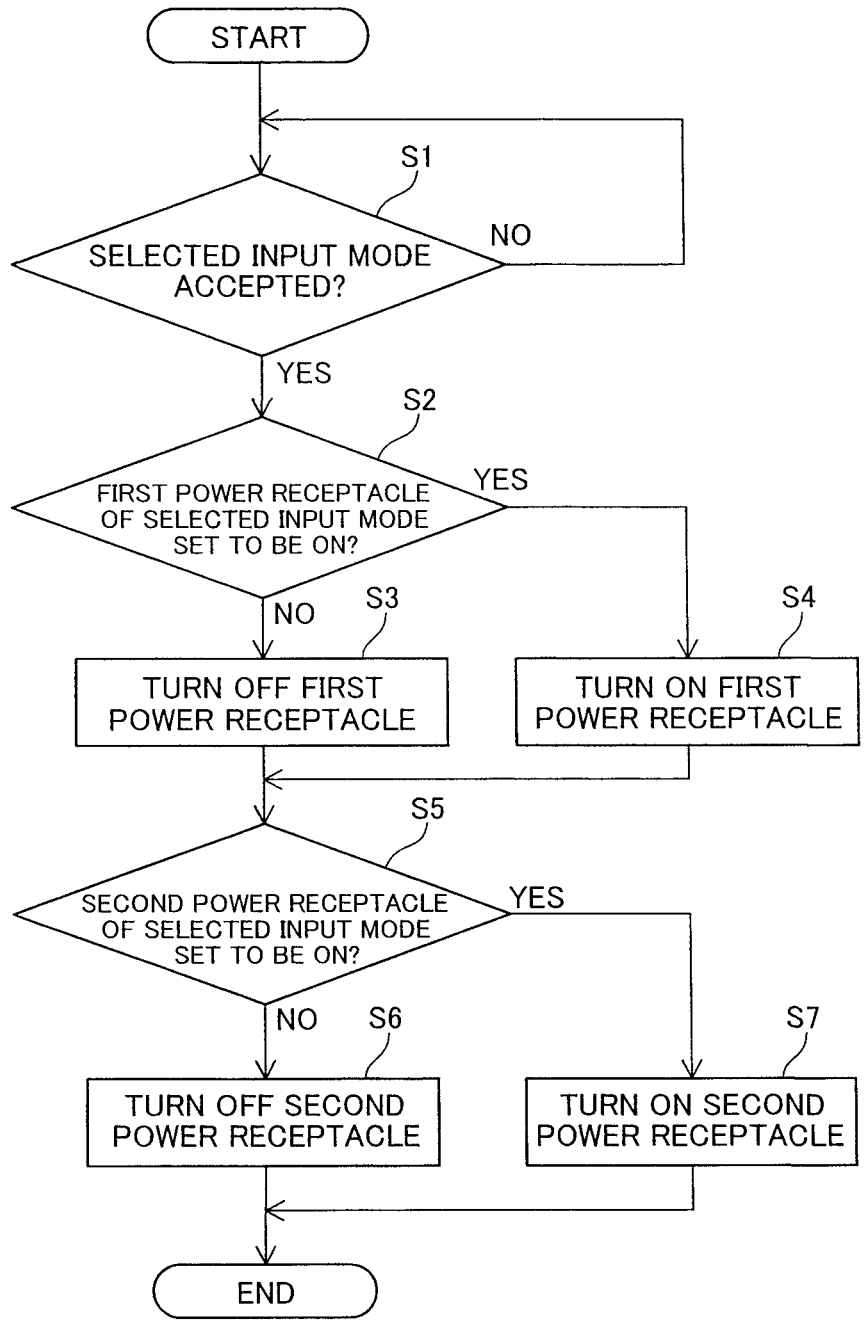
FIG. 8 is a flow chart for illustrating control of power supply (switching process of switches) to the peripheral devices in switching an input mode of the television apparatus according to the first embodiment of the present invention.
Figure 9:
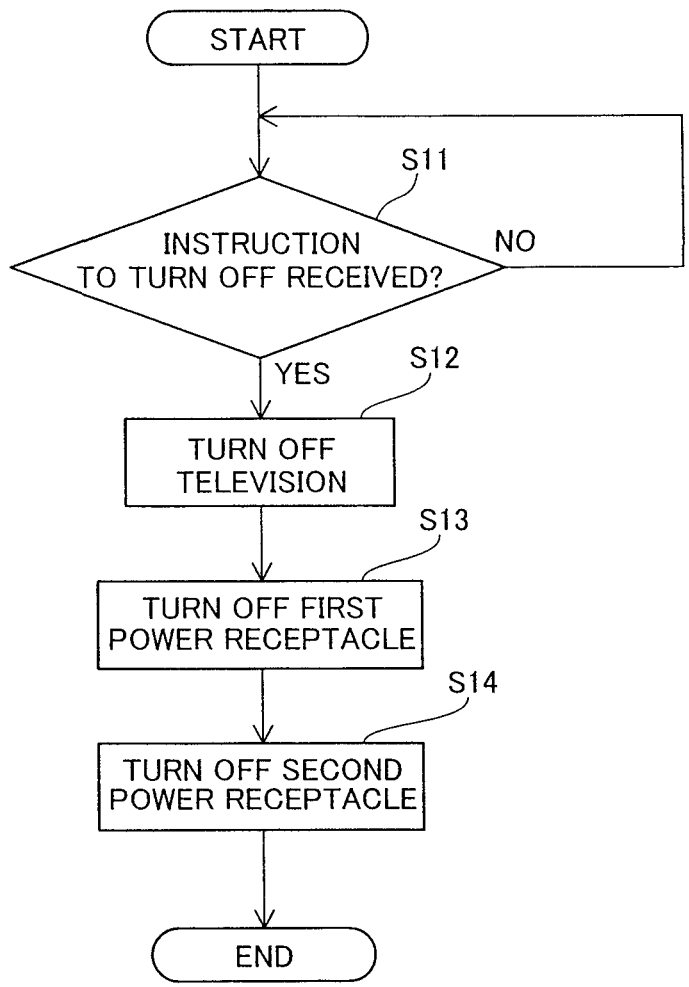
FIG. 9 is a flow chart for illustrating control of power supply (switching process of switches) to the peripheral devices in power off of the television apparatus according to the first embodiment of the present invention.

At a step S1 shown in FIG. 8, the control portion 7 determines whether or not the selected input mode has been accepted. When the selected input mode has not been accepted, this determining step is repeated. When the selected input mode has been accepted, whether or not the set information of the first power receptacle 10a of the input mode selected by the user in the economy power receptacle set information is set to be on is determined at a step S2. When the set information of the first power receptacle 10a is not set to be on (but off), the control portion 7 turns off the first switch 10c corresponding to the first power receptacle 10a (turns off the power source of the first power receptacle 10a) at a step S3. When the set information of the first power receptacle 10a is set to be on, the control portion 7 turns on the first switch 10c corresponding to the first power receptacle 10a (turns on the power source of the first power receptacle 10a) at a step S4.

At a step S5, the control portion 7 determines whether or not the set information of the second power receptacle 10b of the input mode selected by the user in the economy power receptacle set information is set to be on. When the set information of the second power receptacle 10b is not set to be on (but off), the control portion 7 turns off the second switch 10d corresponding to the second power receptacle 10b (turns off the power source of the second power receptacle 10b) at a step S6. When the set information of the second power receptacle 10b is set to be on, the control portion 7 turns on the second switch 10d corresponding to the second power receptacle 10b (turns on the power source of the second power receptacle 10b) at a step S7.

This process is performed every time the user switches the input modes.

The user instructs the television apparatus 1 to turn off by operating the remote control (not shown), the power switch (not shown) or the like, when turning off the television apparatus 1. At this time, the control portion 7 determines whether or not the instruction to turn off has been received at a step S11 shown in FIG. 9. When the instruction to turn off has not been received, this determining step is repeated. When the instruction to turn off has been received, the control portion 7 stops supplying power to the display 2, the tuner 3, the demodulator 4, the decoder 5, the scaler 6 and so on through the power supply portion 10 at a step S12.

At a step S13, the control portion 7 turns off the first switch 10c corresponding to the first power receptacle 10a (turns off the power source of the first power receptacle 10a). At a step S14, the control portion 7 turns off the second switch 10d corresponding to the second power receptacle 10b (turns off the power source of the second power receptacle 10b). According to the first embodiment, as described above, power supply to the peripheral devices connected to the first power receptacle 10a and the second power receptacle 10b are automatically stopped when the power source of the television apparatus 1 is off.

According to the first embodiment, as described above, the first power receptacle 10a and the second power receptacle 10b capable of being connected with the power plugs of the peripheral devices to supply power to the peripheral devices through the power supply portion 10 are provided, whereby power can be supplied to the peripheral devices from the television apparatus 1. When the television apparatus 1 is used as a power source for the peripheral devices as described above, the first switch 10c and the second switch 10d are so controlled as to make a disconnection between the power supply portion 10 and each of the first power receptacle 10a and the second power receptacle 10b where it has been determined that it is not necessary to supply power to the peripheral devices on the basis of the economy power receptacle set information, whereby power supply to the peripheral devices can be automatically stopped even if the power plugs of the peripheral devices remain connected to the first power receptacle 10a and the second power receptacle 10b when the peripheral devices are not being used (when power supply to the peripheral devises is not needed). Consequently, standby power consumption of the peripheral devices can be inhibited although the peripheral devices are not being used, whereby increase of power consumption due to standby power can be inhibited.

Further, the control portion 7 controls the first switch 10c and the second switch 10d, and standby power of the peripheral devices connected to the television apparatus 1 can be reduced by the control by the control portion 7 of the television apparatus 1. Consequently, no apparatus for cutting standby power other than the television apparatus 1 may be separately provided.

According to the first embodiment, as described above, the control portion 7 on-off controls the first switch 10c and the second switch 10d on the basis of the economy power receptacle set information including information about whether to make a connection or disconnection between the power supply portion 10 and each of the first power receptacle 10a and the second power receptacle 10b, set with respect to each type (input mode) of video signals transmitted to the display portion 2. Thus, power supply to the peripheral devices not used for a prescribed input mode of a plurality of the input modes (ground wave broadcast, BS broadcast, VIDEO1, HDMI1 and so on, for example) can be automatically stopped even if the power plugs of the peripheral devices remain connected to the first power receptacle 10a and the second power receptacle 10b when the television apparatus 1 is in a mode of use in which the peripheral devices are not used (when an input mode in which the peripheral devices are not used is selected) by setting the set information to make a disconnection between the power supply portion 10 and each of the first power receptacle 10a and the second power receptacle 10b when the prescribed input mode is selected. Further, power supply to the peripheral devices can be automatically started when the television apparatus 1 is in a mode of use in which the peripheral devices are used (when an input mode in which the peripheral devices are used is selected) by setting the set information to make a connection between the power supply portion 10 and each of the first power receptacle 10a and the second power receptacle 10b when an input mode other than the prescribed input mode is selected.

According to the first embodiment, as described above, when the power source of the television apparatus 1 is turned off, the control portion 7 on-off controls the first switch 10c and the second switch 10d on the basis of the economy power receptacle set information including information to make a disconnection between the power supply portion 10 and each of the first power receptacle 10a and the second power receptacle 10b, whereby power supply to the peripheral devices can be automatically stopped. Consequently, standby power of the peripheral devices can be reduced even if the power plugs of the peripheral devices remain connected to the first power receptacle 10a and the second power receptacle 10b.

According to the first embodiment, as described above, the set information is individually set with respect to each of the first power receptacle 10a and the second power receptacle 10b, whereby a connection state or a disconnection state between the power supply portion 10 and each of the first power receptacle 10a and the second power receptacle 10b can be switched in response to each of the peripheral devices on the basis of the set information individually set with respect to each of the first power receptacle 10a and the second power receptacle 10b, also when different types of peripheral devices are connected to the first power receptacle 10a and the second power receptacle 10b.

According to the first embodiment, as described above, a user can set the economy power receptacle set information, depending on the peripheral devices (mode of use of the television apparatus) supplied with power from the power supply portion 10 by connecting the power plugs thereof to the first power receptacle 10a and the second power receptacle 10b. Thus, the user can reset the economy power receptacle set information in accordance with changed peripheral devices (mode of use of the television apparatus) also when the peripheral devices connected to the first power receptacle 10a and the second receptacle 10b are changed.

According to the first embodiment, as described above, a user can confirm and set the economy power receptacle set information on the economy power receptacle setting screen 2a displayed on the display portion 2, whereby the user can easily confirm and set the economy power receptacle set information on the economy power receptacle setting screen 2a displayed on the display portion 2 of the television apparatus 1.

According to the first embodiment, as described above, the first power receptacle 10a and the second power receptacle 10b are integrally provided in the housing la, whereby a user can easily obtain the power sources of the peripheral devices used together with the television apparatus 1 from the first power receptacle 10a and the second power receptacle 10b provided in the housing la of the television apparatus 1.

Second Embodiment

The structure of a DVD recorder 100 according to a second embodiment of the present invention is now described with reference to FIG. 10. The second embodiment of the present invention is applied to the DVD recorder 100 employed as an exemplary "broadcasting receiver" in the present invention, dissimilarly to the aforementioned first embodiment.

The DVD recorder 100 according to the second embodiment comprises a tuner 101, a demodulator 102, a decoder 103, a scaler 104, a magnetic disk drive 105, an optical disk drive 106, and a control portion 107 controlling each part of the DVD recorder 100. Functions of the tuner 101, the demodulator 102, the decoder 103 and the scaler 104 are similar to those of the television apparatus 1 according to the aforementioned first embodiment. The tuner 101 is an example of the "broadcast signal receiving portion" in the present invention. The "receiver body" in the present invention is constituted by the tuner 101, the demodulator 102, the decoder 103, the scaler 104, etc.

The DVD recorder 100 is provided with a terminal area 108 for connecting peripheral devices, and a variety of the peripheral devices can be connected to the DVD recorder 100 through the terminal area 108. For example, a monitoring device 34 is connected to the DVD recorder 100 so that images based on a video signal from the DVD recorder 100 can be displayed on the monitoring device 34. The monitoring device 34 is an example of the "peripheral device" in the present invention.

Further, the DVD recorder 100 is so formed as to supply power to each of the tuner 101, the demodulator 102, the decoder 103, the scaler 104, the magnetic disk drive 105, the optical disk drive 106, the control portion 107, etc. through a power supply portion 110 by connecting a power plug 109 thereof to a domestic power receptacle 40. A power source of the DVD recorder 100 can be switched on/off by operating a power switch (not shown) thereof, a remote control (not shown) or the like. When the power source is on, power is supplied to each of the tuner 101, the demodulator 102, the decoder 103, the scaler 104, the magnetic disk drive 105, the optical disk drive 106, the control portion 107, etc. When the power source is off, power is not supplied to the tuner 101, the demodulator 102, the decoder 103, the scaler 104, the magnetic disk drive 105, the optical disk drive 106, etc. but is supplied only to the control portion 107.

According to the second embodiment, a first power receptacle 110a, a second power receptacle 110b, a first switch 110c and a second switch 110d are provided in the DVD recorder 100, similarly to the aforementioned first embodiment. Power plugs of the peripheral devices are connected to the first power receptacle 110a and the second power receptacle 110b so that power can be supplied to the peripheral devices from the DVD recorder 100. In an example shown in FIG. 10, a power plug 33a of a booster 33 and a power plug 34a of the monitoring device 34 are connected to the first power receptacle 110a and the second power receptacle 110b, respectively. The first power receptacle 110a and the second power receptacle 110b are examples of the "power receptacle portion" in the present invention, and the first switch 110c and the second switch 110d are examples of the "switch portion" in the present invention.

The control portion 107 is so formed as to switch on/off the first switch 110c and the second switch 110d on the basis of economy power receptacle set information stored in a memory (not shown). This economy power receptacle set information includes information about whether to turn on or off each of the first switch 110c and the second switch 110d, which is individually set with respect to each of prescribed set modes of use and with respect to each of the first switch 110c and the second switch 110d. Examples of the mode of use include states where a video signal by a ground wave broadcast is transmitted to the monitoring device 34 or the like from the DVD recorder 100, a video signal by a BS broadcast is transmitted to the monitoring device 34 or the like, a video signal from the magnetic disk drive 105 is transmitted to the monitoring device 34 or the like, a video signal from the optical disk drive 106 is transmitted to the monitoring device 34 or the like, etc. The examples of the mode of use also include a state where the power source of the DVD recorder 100 is on or off. In other words, the control portion 107 is so formed as to automatically switch on/off the first switch 110c and the second switch 110d, depending on whether the power source of the DVD recorder 100 is on or off and which images from among images based on a ground wave broadcast, images based on a BS broadcast, images from the magnetic disk drive 105, images from the optical disk drive 106 and so on are transmitted to the monitoring device 34 or the like when the power source of the DVD recorder 100 is on.

According to the second embodiment, the economy power receptacle set information is set such that the first switch 110c corresponding to the first power receptacle 110a connected with the booster 33 is turned on when the video signal by the ground wave broadcast is being transmitted or being recorded and is turned off when video signals other than the video signal by the ground wave broadcast are being transmitted. Thus, power is supplied to the booster 33 only when it is necessary to use a function of the booster 33 and not supplied to the booster 33 when it is not necessary to use the function of the booster 33. Further, the economy power receptacle set information is set such that the second switch 110d corresponding to the second power receptacle 110b connected with the monitoring device 34 is turned on when the video signals are being transmitted to the monitoring device 34 and is turned off when the video signals are not being transmitted thereto (such as when recording is only performed). Thus, power is supplied to the monitoring device 34 when it is necessary to use a function of the monitoring device 34 (function of displaying images) and not supplied to the monitoring device 34 when it is not necessary to use the function of the monitoring device 34.

The first switch 110c and the second switch 110d corresponding to the first power receptacle 110a and the second power receptacle 110b, respectively are both set to be turned off when turning off the power source of the DVD recorder 100, similarly to the aforementioned first embodiment.

The effects of the second embodiment are similar to those of the aforementioned first embodiment.

Although the present invention has been described and illustrated in detail, it is clearly understood that the same is by way of illustration and example only and is not to be taken by way of limitation, the spirit and scope of the present invention being limited only by the terms of the appended claims.

For example, while the aforementioned first and second embodiments of the present invention are applied to the television apparatus 1 and the DVD recorder 100, respectively, employed as an exemplary "broadcasting receiver" in the present invention, the present invention is not restricted to this but is also applicable to another broadcasting receiver other than the television apparatus and the DVD recorder. The present invention is also applicable to an STB (Set Top Box) or a Blu-ray disc recorder, for example.

While a user can change the economy power receptacle set information in each of the aforementioned first and second embodiments, the present invention is not restricted to this but information about whether to turn on or off the switch portion may be preliminarily fixedly set with respect to each mode of use of the broadcasting receiver.

While the two power receptacle portions (first power receptacle and second power receptacle) are provided on the broadcasting receiver in each of the first and second embodiments, the present invention is not restricted to this but one power receptacle portion may be provided or more than two power receptacle portions may be provided.

While the first and second switches are both turned off when turning off the power source of the broadcasting receiver in each of the first and second embodiments, the present invention is not restricted to this but the economy power receptacle set information may be set such that each of the switch portions remains to be turned on also when turning off the power source of the broadcasting receiver. For example, when power is supplied to the DVD recorder from the power receptacle portion provided on the television apparatus, the economy power receptacle set information may be set such that the switch portion remains to be turned on also where the power source of the television apparatus is turned off. Since the DVD recorder has a function independent from a function of the television apparatus such as automatic recording function, the function (recording function, for example) of the DVD recorder may be used also when the television apparatus is not used (when the power source is turned off). The economy power receptacle set information is set as described above, whereby power can be supplied to the DVD recorder also when turning off the power source of the television apparatus. Consequently, the recording function etc. of the DVD recorder can be used.

While the input modes of the video signals by the television broadcast (ground wave broadcast, BS broadcast, etc.) and the input modes (VIDEO, HDMI, etc.) of the video signals from the external devices are described as a mode of use of the television apparatus in each of the first and second embodiments, the present invention is not restricted to this. When the television apparatus has a storage device such as a hard disk and has a function of recording in the storage device, for example, the set information may be set such that the switch of the power receptacle portion is automatically switched on or off at a time when a user selects a mode in which video data stored in the television apparatus is reproduced on the display portion. The video data stored in the storage device such as a hard disk is an example of "video data possessed by the broadcasting receiver itself/the television apparatus itself".

What is claimed is:

1. A broadcasting receiver comprising:
a receiver body generating a video signal on the basis of a broadcast signal received by a broadcast signal receiving portion;
a power supply portion supplying power to said receiver body;
a power receptacle portion connected to said power supply portion and capable of being connected with a power plug of a plurality of types of peripheral devices for supplying power to said peripheral devices from said power supply portion;
a switch portion for making a connection and disconnection between said power supply portion and said power receptacle portion; and
a control portion controlling said receiver body, wherein
said control portion determines whether or not it is necessary to supply power to said peripheral device connected to said power receptacle portion on the basis of a prescribed set information, and controls said switch portion to make a disconnection between said power supply portion and said power receptacle portion when having determined that it is not necessary to supply power to said peripheral device,
said set information includes information about whether to make a connection or disconnection between said power supply portion and said power receptacle portion, the information being set with respect to each of preliminarily set plural modes of use of said broadcasting receiver and in response to types of said peripheral devices, wherein when a different peripheral device is connected to the power receptacle portion, it changes during which of the plural modes the power supply portion will be connected to the power receptacle portion to power the different peripheral device.

2. The broadcasting receiver according to claim 1, wherein at least part of said set information is so formed as to be capable of being changed by a user on a display portion, in response to said preliminarily set plural modes of use of said broadcasting receiver and said types of said peripheral devices.

3. The broadcasting receiver according to claim 2, wherein said set information is so formed as to be capable of being set by a user such that it is determined that it is not necessary to supply power to said peripheral device in a prescribed first mode of use when not using said peripheral device supplied with power from said power receptacle portion in said first mode of use and such that it is determined that it is necessary to supply power to said peripheral device in a prescribed second mode of use when using said peripheral device supplied with power from said power receptacle portion in said second mode of use.

4. The broadcasting receiver according to claim 1, wherein
said peripheral device includes an external device outputting a video signal,
said receiver body is so formed as to be capable of transmitting at least any of a video signal based on said broadcast signal, a video signal based on video data possessed by the broadcasting receiver itself and a video signal from said external device to a display portion in response to a selection by a user, and
said set information includes information about whether to make a connection or disconnection between said power supply portion and said power receptacle portion, set correspondingly to a type of a video signal transmitted to said display portion by said receiver body, as information set with respect to each of said plurality of modes of use.

5. The broadcasting receiver according to claim 1, wherein
said set information includes information about whether to make a connection or disconnection between said power supply portion and said power receptacle portion when turning off a power switch of said broadcasting receiver while maintaining power supply to said control portion, as information set with respect to each of said plurality of modes of use.

6. The broadcasting receiver according to claim 5, wherein
said set information is preliminarily set to make a disconnection between said power supply portion and said power receptacle portion when turning off said power switch of said broadcasting receiver while maintaining power supply to said control portion.

7. The broadcasting receiver according to claim 1, wherein
at least part of said set information is so formed as to be capable of being set by a user.

8. A television apparatus comprising:
a receiver body generating a video signal on the basis of a broadcast signal received by a broadcast signal receiving portion;
a power supply portion supplying power to said receiver body;
a power receptacle portion connected to said power supply portion and capable of being connected with a power plug of a plurality of types of peripheral devices for supplying power to said peripheral devices from said power supply portion;
a switch portion for making a connection and disconnection between said power supply portion and said power receptacle portion;
a display portion capable of displaying images based on a video signal by at least said broadcast signal; and
a control portion controlling said receiver body, wherein
said control portion determines whether or not it is necessary to supply power to said peripheral device connected to said power receptacle portion on the basis of a prescribed set information, and controls said switch portion to make a disconnection between said power supply portion and said power receptacle portion when having determined that it is not necessary to supply power to said peripheral device,
said set information includes information about whether to make a connection or disconnection between said power supply portion and said power receptacle portion, the information being set with respect to each of preliminarily set plural modes of use of said broadcasting receiver and in response to types of said peripheral devices, wherein when a different peripheral device is connected to the power receptacle portion, it changes during which of the plural modes the power supply portion will be connected to the power receptacle portion to power the different peripheral device.

9. The television apparatus according to claim 8, wherein
at least part of said set information is so formed as to be capable of being changed by a user on the display portion, in response to said preliminarily set plural modes of use of said television apparatus and said types of said peripheral devices.

10. The television apparatus according to claim 8, wherein
said peripheral device includes an external device outputting a video signal,
said receiver body is so formed as to be capable of transmitting at least any of a video signal based on said broadcast signal, a video signal based on video data possessed by the television apparatus itself and a video signal from said external device to said display portion in response to a selection by a user, and
said set information includes information about whether to make a connect or disconnection between said power supply portion and said power receptacle portion, set correspondingly to a type of a video signal transmitted to said display portion by said receiver body, as information set with respect to each of said plurality of modes of use.

11. The television apparatus according to claim 8, wherein
said set information includes information about whether to make a connection or disconnection between said power supply portion and said power receptacle portion when turning off a power switch of said television apparatus while maintaining power supply to said control portion, as information set with respect to each of said plurality of modes of use.

* * * * *